United States Patent [19]

Barringer

[11] 3,868,222
[45] Feb. 25, 1975

[54] HIGH RESOLUTION GEOCHEMICAL PROSPECTING METHOD AND APPARATUS

[75] Inventor: Anthony Rene Barringer, Willowdale, Ontario, Canada

[73] Assignee: Barringer Research Limited, Rexdale, Ontario, Canada

[22] Filed: Jan. 9, 1974

[21] Appl. No.: 431,962

[30] Foreign Application Priority Data
Mar. 19, 1973 Canada .............................. 166975

[52] U.S. Cl. ......... 23/230 EP, 23/232 R, 23/254 R, 73/28, 73/421.5 R
[51] Int. Cl.... G01n 1/22, G01n 31/12, G01n 33/24
[58] Field of Search ........ 23/230 EP, 254 R, 255 R, 23/232 R; 73/28, 421.5 R

[56] References Cited
UNITED STATES PATENTS

| | | | |
|---|---|---|---|
| 3,309,518 | 3/1967 | Weiss | 73/28 X |
| 3,420,636 | 1/1969 | Robbins | 23/232 R X |
| 3,462,995 | 8/1969 | Weiss | 73/28 |
| 3,759,617 | 9/1973 | Barringer | 73/28 X |

Primary Examiner—Robert M. Reese
Attorney, Agent, or Firm—Rogers, Bereskin & Parr

[57] ABSTRACT

A high resolution geochemical prospecting system in which particles in large volumes of air are received, highly concentrated and then analyses are made of particles collected during periods of not more than 15 seconds each.

17 Claims, 2 Drawing Figures

PATENTED FEB 25 1975 3,868,222

HIGH RESOLUTION GEOCHEMICAL PROSPECTING METHOD AND APPARATUS

This invention relates to a method of performing a rapid geochemical survey of the earth from a moving vehicle such as an aircraft.

It is known to prospect for mineral deposits by collecting and analyzing atmospheric particulates, as shown in U.S. Pat. Nos. 3,309,518 and 3,462,995 of Oscar Weiss. However, the prior methods and apparatus shown in these patents are less than satisfactory for a number of reasons. First, in U.S. Pat. No. 3,309,518 the particulates are collected on a relatively impervious membrane filter through which air is drawn by a vacuum pump. The particulates then are analyzed by means off an X-ray spectrometer. Since the filter is of relatively large area (e.g. about 10 cm.) and the beam of the X-ray spectrometer is only about one micron in diameter, finding particles of micron size in the relatively vast area of the filter is like looking for the proverbial 'needle in a haystack' and therefore after collection of the particles on the filter it was necessary to concentrate the particles by dissolving the filter in a solvent and depositing the particles onto a small area of a disc. Since the permeability of the filter was low the volume of air sampled was undesirably low. Moreover, it would have been impractical to change the filters more frequently than every few minutes, during which time the aircraft would have covered a few miles, so that the above arrangement would not be very suitable for observing from an aircraft highly specific geochemical atmospheric anomalies. In the more recent Pat. No. 3,462,995 an effort was made to overcome these disadvantages by using frames around which were wound long pieces of thin nylon thread such as fishing line. The frames were towed behind the aircraft, and an arrangement was employed for simultaneously lowering one frame while lifting another frame so that the particulates would be sampled on a more or less continuous basis. After collection and prior to analysis of the particles, the particles were concentrated, either by ashing the nylon threads or by drawing the nylon thread across a pad to which the particles would adhere. Although this arrangement was said to be an improvement on the prior arrangement, never-the-less in practice the particles were still sampled for a considerable period of time (e.g. 5 minutes) before a new sample was taken, so that the resolution of the system necessarily was very low.

In the present invention, a large volume of air containing atmospheric particulates per unit time is ingested and then the particulates are concentrated to a high degree while they are moving in a stream before they are collected on a moving tape (instead of collecting first and concentrating later as in the case of the Weiss arrangements) or before they are analyzed (where the analysis is made continuously during flight). The system is extremely sensitive, and the use of the system has lead to a number of unexpected and important discoveries including the following. First, strong anomalies were observed over known mines in areas covered by dense vegetation; second, hydrocarbon anomalies were observed over the sea; and third, the observed atmospheric geochemical anomalies over known mines are usually very sharp and localized and in many cases provide a stronger contrast than the contrast obtained by conventional surface geochemical analyses.

A preferred embodiment of the invention is illustrated in the accompanying drawings wherein.

Figure 1:
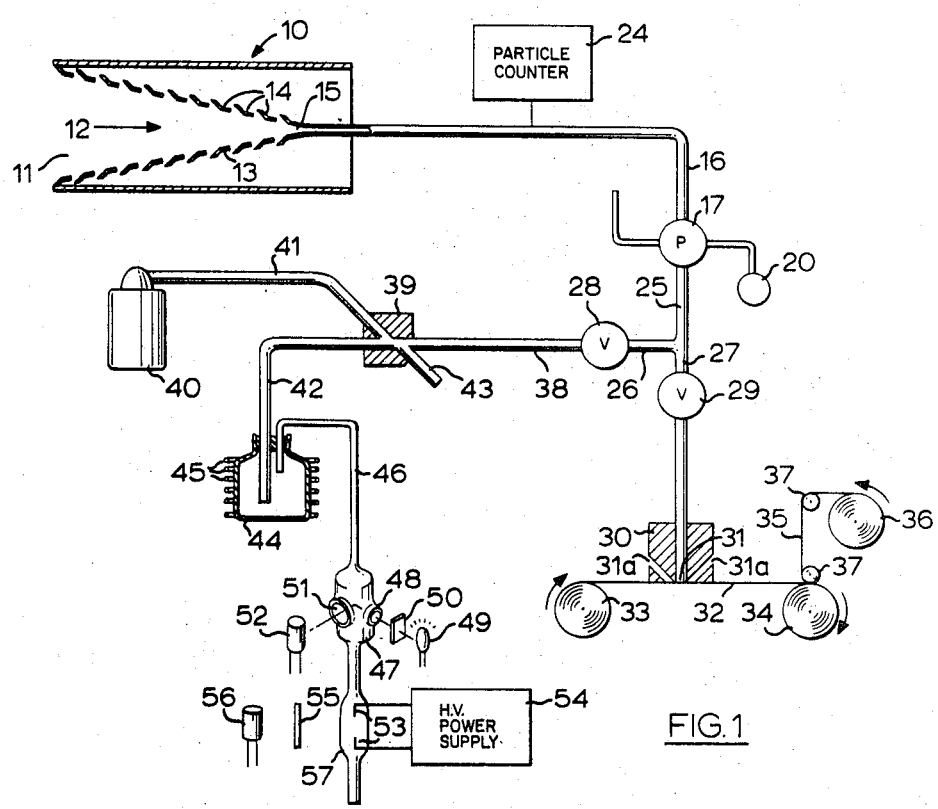
FIG. 1 is a diagrammatic view of one form of the invention.

Referring to the drawings, a particle concentrator generally indicated by reference numeral 10 has an inlet 11 for receiving a moving stream of air containing particles. Arrow 12 indicates the direction of the air flow. The concentrator 10 may be installed in any convenient location on the aircraft or other vehicle, such as under a wing or in the nose, with the inlet 11 facing the direction of flight so that the greatest possible volume of air is received by the concentrator 11 per unit of time. Preferably the concentrator 11 should be dimensioned such that about ten cubic meters of air per minute passes through the inlet 11. In general, the greater the rate of flow of incoming air, the better. Of course, the size of the aircraft or other vehicle may dictate a practical upper limit. Also, two collectors may be employed if capacity of the aircraft permits.

Air which has passed through the inlet 11 of the concentrator 10 strikes walls 13 of the concentrator 10 at high velocity and particles bounce off the walls 13 towards the apex of the concentrator 10. The walls 13 may be arranged to form a pyramidal or conical shape, and the walls 13 are formed of sheet metal that has been cut and worked to form a plurality of small louvres 14 which are disposed at an acute angle to the direction of the incoming air. This arrangement allows air to escape through the louvres 14, but most of the particles do not escape since they have considerable inertia and are unable to turn through the sharp angles required to escape through the louvres 14. Very fine particles (e.g. below about 1 micron in diameter) are entrained in the air and tend to escape through the louvres 14 with the air. It is desirable to dimension the louvres 14 such that the turning radius required for a particle to escape through a louvre opening is minimal, so that statistically the majority of particles will strike the walls 13 of the concentrator 10 and not escape through the openings of the louvres 14. It has been found that openings of a length of about 2 cm., width of 4mm, provide satisfactory results. Preferably the angle between the louvres 14 and the wall 13 is about (30°).

Figure 2:
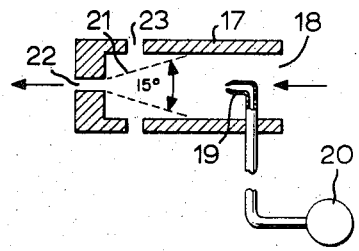
FIG. 2 is a diagrammatic view of a jet pump shown in FIG. 1.

A concentrated stream of particles emerges from apicial outlet 15 of the concentrator 10 and is fed via a tube 16 to a jet pump 17 which is illustrated in somewhat greater detail in FIG. 2. The function of the jet pump 17 is to provide additional suction in the system to facilitate transport of the concentrated stream of particles. Referring to FIG. 2, a stream of air containing concentrated particulates enters the jet pump 17 through inlet 18 and passes a down-stream facing nozzle 19 which is connected to a source 20 of compressed air, such as conventional pump or tank containing compressed air. A conical shaped sieve 21 is positioned with its open apex adjacent outlet 22, so that the stream of air and concentrated particles can pass through the outlet 22. The sieve 21 is made of thin metal of approximately 200 mesh (200 openings per inch), and the sieve 21 tends to prevent particles from escaping through vents 23 formed in the walls of the jet pump 17 to permit escape of excess air supplied through the nozzle 19. When the height of the nozzle 19 is adjusted to its optimum position, a suction of between about 8 to 9 inches water-gauge may be attained.

It is desirable to monitor the mass flow rate of the stream of concentrated particles to provide a measure of normalization. This may be accomplished, at least approximately, by means of a conventional light scattering particle monitor 24 that is normally used for measuring particulate concentrations on a dynamic basis. Essentially, the monitor 24 provides a beam of light (e.g. from a laser source) which illuminates the particles and measures the light scattered by the particles. The monitor 24 may be installed between the concentrator 10 and the jet pump 17. Alternatively, or in addition to the above, the system may be normalized against a common element or compound not related to mineralization such as silicates in the case of a land system and chlorine in the case of an off-shore system. In such cases the silicate or chlorine content of the particles would separately be measured, and the measurement of the predetermined elements or compounds of interest would be compared with the measurement of the said common element. Normalization is not extremely critical, however, as useful results have been attained without any normalization.

After passing through the jet pump 17, the stream of concentrated particles travels along a pipe 25 which is connected to two pipes 26 and 27. Valves 28 and 29 are respectively connected to the pipes 26 and 27 to permit the stream of concentrated particles to flow through either or both of the pipes 26 and 27. The pipe 27, downstream of the valve 29, is connected to a nozzle 30 having an orifice 31 through which the concentrated particles emerge. The nozzle 30 is also formed with diagonally extending air vents **31*a*** which bleed off a substantial amount of the air contained in the stream of moving particles.

After emerging from the nozzle 30, the particles are directed against and captured by an adhesive-coated continuous length of tape 32 which is wound around a feed reel 33 and a take-up reel 34. The tape 32 is preferably of a thin, strong synthetic resin that is relatively impervious to and non-reactive with a leaching solution (described below) which is subsequently applied to the tape 32. A suitable tape is a polyester tape that is manufactured by 3M Corporation and identified as No. 583 tape. This tape may be obtained in rolls with pressure sensitive adhesive applied to one side. The tape 32 and its adhesive coating must be non-contaminating, i.e., the subsequent analysis of the particles for specific elements and compounds must not be affected by the constitution of the tape 32 or of its adhesive coating.

It is desirable to protect the particles from exposure to the atmosphere after collection. This may be accomplished by providing a tape 35 which is wound around a feed reel 36 and which is guided by several guide rollers 37 so that the tape 35 runs parallel to the tape 32 downstream from the nozzle 31, and after being pressed together the tapes 32 and 35 are wound together on the take-up reel 34. The face of the tape 35 which is in contact with the adhesive-coated face of the tape 32 is preferably coated with a noncontaminating release agent for the adhesive in question (such as a silicone composition), so that the two tapes 32 and 35 can be pulled apart easily prior to the analysis of the particles, without any appreciable loss of the particles from the tape 32. Air vents **31*a* of the nozzle 30 are disposed at an angle to the direction of the stream of particles flowing through the nozzle 30 such that the particles cannot turn through the sharp angle required to escape through the vents 31a, and therefore the particles continue in their straight path through the orifice 31 to impinge upon the tape 32. By bleeding off excess air through the vents 31*a*, there is less tendency for the particles to be swept past the tape 32** in turbulent air.

The particles may be analyzed by applying a drop of a suitable reagent to incremented portions of the tape, allowing the drop to remain on the tape for a few seconds until the particles have been leached sufficiently, drawing off the drop, and then analyzing the drop for predetermined elements or compounds in any conventional spectrophotometric analyzer such as an atomic absorption spectrometer. Typical elements which may in this manner be analyzed include copper, lead, zinc, silver and nickel.

The tape 32 may be caused to move continuously, or else step wise. In either case it is necessary that the displacement of the tape per unit of time be such that groups of particles collected during periods of fifteen seconds or less can separately be analyzed, and preferably the period should be as low as 5 or 6 seconds or even less, to permit a high degree of resolution.

It will be understood that other types of tapes may be used for storing the particles prior to analysis. For example, a tape made of polytetrafluorethylene which has been passed through a corona discharge to give it an electrostatic charge may be used. The electrostatic charge would attract and hold the particles without the need of an adhesive. Alternatively, the tape may be made of a suitable filter paper having sufficiently small pores to capture particles of about 1 micron size and greater.

The portion of the system described above requires laboratory analysis of the particles collected on the tape 32. However, it is possible to analyze some matter such as mercury, sulphur, hydrocarbon radicals, etc. in real time, i.e., immediately after the particles have been collected, in the survey aircraft or other vehicle itself. This may be accomplished by the following portion of the system.

The stream of air and particles emerging from the valve 28 when it is in its open condition, passes along a tube 38 to a transfer block 39 which has fully been described in Canadian patent application No. 132,220 filed Jan. 12, 1972 of Barringer Research Limited. The function of the transfer block 39 is to transfer the particles from the stream of air into a stream of an inert carrier gas such as argon, to facilitate the subsequent analysis. This is achieved by an arrangement of internal passages in the transfer block 39 such that the air stream is caused to impinge against a stream of pure argon, the air stream being folded back on itself at an acute angle, thus causing the particles to pass into the argon stream by virtue of their inertia. Argon, stored under pressure in a bottle 40, is fed via tube 41 to the transfer block 39. The particles are then transferred to the stream of argon and they pass from the transfer block 39 into a tube 42. Waste air is exhausted through tube 43. The particles in the argon stream then pass into a quartz bottle 44 which is closely surrounded by a high temperature resistance heating wire 45 which is embedded in a suitable high temperature cement. Electric current is supplied to the wire 45 in order to heat the particles to at least about 800°C. At this temperature many important constituents of the particles are volatized, such as mercury and hydrocarbon radicals. The volatized matter emerges from the bottle 44 and flows along a tube 46 into a conventional resonance radiation cell 47 having a window 48 through which light from a selected source, such as a mercury vapour lamp 49 is caused to illuminate the hot gases and vapours in the cell 47. It is desirable to position an interference filter 50 between the lamp 49 and the window 48 of the cell 47 to attenuate all but the 2537A mercury line from the lamp 49. When mercury atoms are present in the cell 47, they absorb light from the lamp 49 and re-emit resonance radiation in all direction. A window 51, which preferably is positioned at right angles to the window 48, permits resonance radiation to be measured by means of a photodetector 52 such as a photomultiplier tube which is aligned with the window 51.

To measure hydrocarbon radicals, a plasma tube 57 is positioned downstream from the cell 47. A pair of spaced apart electrodes 53 is positioned in the plasma tube 57, and the electrodes 53 are connected to a suitable source 54 of high voltage. The striking voltage of the plasma typically is about 1200 volts with a sustaining voltage of about 400 volts. An interference filter 55 is positioned adjacent to the plasma tube 57, and it passes light of a selected wavelength, such as the 4313A band of the CH molecule. Light which has passed through the filter 55 is received by a suitable photodetector 56 such as a photomultiplier. The outputs of the photodetectors 52 and 56 consist of electrical voltages which may be amplified, electronically processed and recorded in any conventional manner.

The apparatus described above may be installed in any convenient vehicle such as an aircraft having a size and range appropriate for the survey work to be performed. Typical flying heights are between about 65–130 meters, but interesting results have been attained at even greater heights.

It is desirable to concentrate the particulates at least by a factor of about 100 and preferably more. The concentrator 10 described above is able to achieve concentrations of the order of about 200,000 to 1, i.e. the ratio of incoming air to outgoing air is about 200,000 to 1.

As used herein, the term "mineral deposits" includes metalliferous and non-metalliferous ore bodies, hydrocarbon deposits (including oil, gas and coal) and geothermal (water) deposits.

What I claim is:

1. A method of performing a rapid geochemical survey of an area of the earth from a moving vehicle comprising:
   a. receiving, at known locations in said area, an air stream containing atmospheric particulates, the rate of flow of said air stream being at least about 10 cubic meters per minute;
   b. concentrating said particulates as they are moving in said air stream, and forming a stream of concentrated particles;
   c. successively analyzing said concentrated particles for predetermined elements or compounds, which successive analyses are respectively made of particles which were received during period of not more than 15 seconds each; and
   d. correlating said analyzed particles with said known locations to thereby determine the location in said area of the source of said particles.

2. A method as claimed in claim 1 wherein said air stream initially has substantially the same speed as the speed of the aircraft.

3. A method as claimed in claim 1 wherein prior to said analysis, said particles are deposited on a tape which is moved at a sufficient rate such that separate analyses may subsequently be made of particles received during said 15 second periods.

4. A method as claimed in claim 3 wherein said tape is non-porous and said particles are analyzed by successively applying a drop of a leaching solution to incremental portions of the tape, permitting said leaching solution to dissolve selected constituents of said particles, removing said drop of leaching solution and analyzing said drop, and repeating the aforesaid procedure for additional incremented portions of said tape.

5. A method as claimed in claim 1 wherein after said particles are concentrated, they are transferred to a stream of an inert carrier gas prior to the analysis thereof.

6. A method as claimed in claim 5 wherein after said particles have been transferred to said stream of inert carrier gas, and prior to analysis, the particles are heated to a predetermined temperature that is sufficient to volatize selected elements or compounds contained in said particles.

7. Apparatus for performing from a moving vehicle a rapid geochemical survey of an area of the earth, comprising:
   a. means for receiving, at known locations in said area, an air stream containing atmospheric particulates which particulates may comprise matter that is indicative of the presence of a mineral deposit in said area,
   b. means for concentrating said particulates immediately after they have been received and while they are moving in a stream, and
   c. means for analyzing said concentrated particulates to determine if any of said matter is present therein and hence to determine the likelihood of the existence of said mineral deposit in said area.

8. Apparatus as claimed in claim 7 wherein the rate of flow of said air stream in said receiving means is at least about 10 cubic meters per minute.

9. Apparatus as claimed in claim 7 wherein said analyzing means includes means for transferring said particles to an inert carrier gas, means connected to said transfer means for heating said particles to volatize at least a portion of said matter after the particulates have been transferred to said inert carrier gas, and plasma means connected with said heating means for exciting said matter sufficiently to cause said matter to emit light of predetermined wavelengths.

10. Apparatus as claimed in claim 7 wherein said analyzing means is operative successively to analyze particles collected during periods of not more than 15 seconds each.

11. Apparatus as claimed in claim 10 wherein the rate of flow of said air stream in said receiving means is at least about 10 cubic meters per minute.

12. Apparatus as claimed in claim 7 including means connected with said concentrating means for depositing said particles on a strip including means for moving said strip at a predetermined rate.

13. Apparatus as claimed in claim 12 wherein the rate of flow of said air stream in said receiving means is at least about 10 cubic meters per minute.

14. Apparatus as claimed in claim 12 wherein said analyzing means is operative successively to analyze particles collected during periods of not more than 15 seconds each.

15. Apparatus as claimed in claim 14 wherein the rate of flow of said air stream in said receiving means is at least about 10 cubic meters per minute.

16. Apparatus as claimed in claim 15 wherein the ratio of the volume of air entering said concentrating means to the volume of air leaving said concentrating means is about 200,000 to 1.

17. Apparatus as claimed in claim 15 wherein the ratio of the volume of the air entering said concentrating means to the volume of air leaving said concentrating means is at least about 100 to 1.

* * * * *